United States Patent [19]

Lang

[11] Patent Number: 5,156,361
[45] Date of Patent: Oct. 20, 1992

[54] MODULAR SPACE STATION

[76] Inventor: Mark S. Lang, 771 D Ave., Apt. A, Coronado, Calif. 22118

[21] Appl. No.: 232,456

[22] Filed: Aug. 16, 1988

[51] Int. Cl.$^5$ .............................................. B64G 1/10
[52] U.S. Cl. ............................... 244/159; 244/158 R; 244/163
[58] Field of Search ................... 244/158 R, 159, 161, 244/163

[56] References Cited

U.S. PATENT DOCUMENTS 3,749,332  7/1973  Gray .................................. 244/163
4,122,991 10/1978  Johnston et al. ..................... 244/159
4,298,178 11/1981  Hujsak .............................. 244/161
4,728,060  3/1988  Cohen .............................. 244/161

FOREIGN PATENT DOCUMENTS 241970 10/1987 European Pat. Off. ............ 244/159

Primary Examiner—Joseph F. Peters, Jr.
Assistant Examiner—Christopher P. Ellis
Attorney, Agent, or Firm—Shoemaker and Mattare, Ltd.

[57] ABSTRACT

A space station including a frame defining plural identical sites for receiving interchangeable cargo modules. The sites are angularly spaced about the center of the station. Modules may thus be received at any available site.

1 Claim, 2 Drawing Sheets

MODULAR SPACE STATION

BACKGROUND OF THE INVENTION

This invention relates to earth satellites and more particularly to a modular satellite formed from an array of growth patterned cells arranged in a system of radially concentric shells, the cells being removable so that they can be replaced without disturbing the integrity of the satellite and without affecting neighboring cells.

Known prior satellites and space stations, designed for specific functions, have not employed the modular concept so well known in warehousing and cargo operations on earth. Application of this technology to satellites will vastly increase their potential versatility and long-term usefulness.

The present invention provides a three-dimensional framework for an array of modules, arranged preferably in concentric nested shells whose surfaces are spheres, regular polygons, or tapered cylinders. Access to the interior of the array is provided so that even the innermost modules may be accessed without disturbing the integrity of the array.

SUMMARY OF THE INVENTION

The invention is summarized as a modular space station comprising a frame having radial symmetry and defining a plurality of equiangularly spaced sites for receiving cargo modules of a predetermined standard external geometry, whereby standard cargo modules may be removably installed into said frame at any available site.

BRIEF DESCRIPTION OF THE DRAWINGS

In the accompanying drawings.

DESCRIPTION OF THE PREFERRED EMBODIMENT

The Modular Structure

Figure 1:
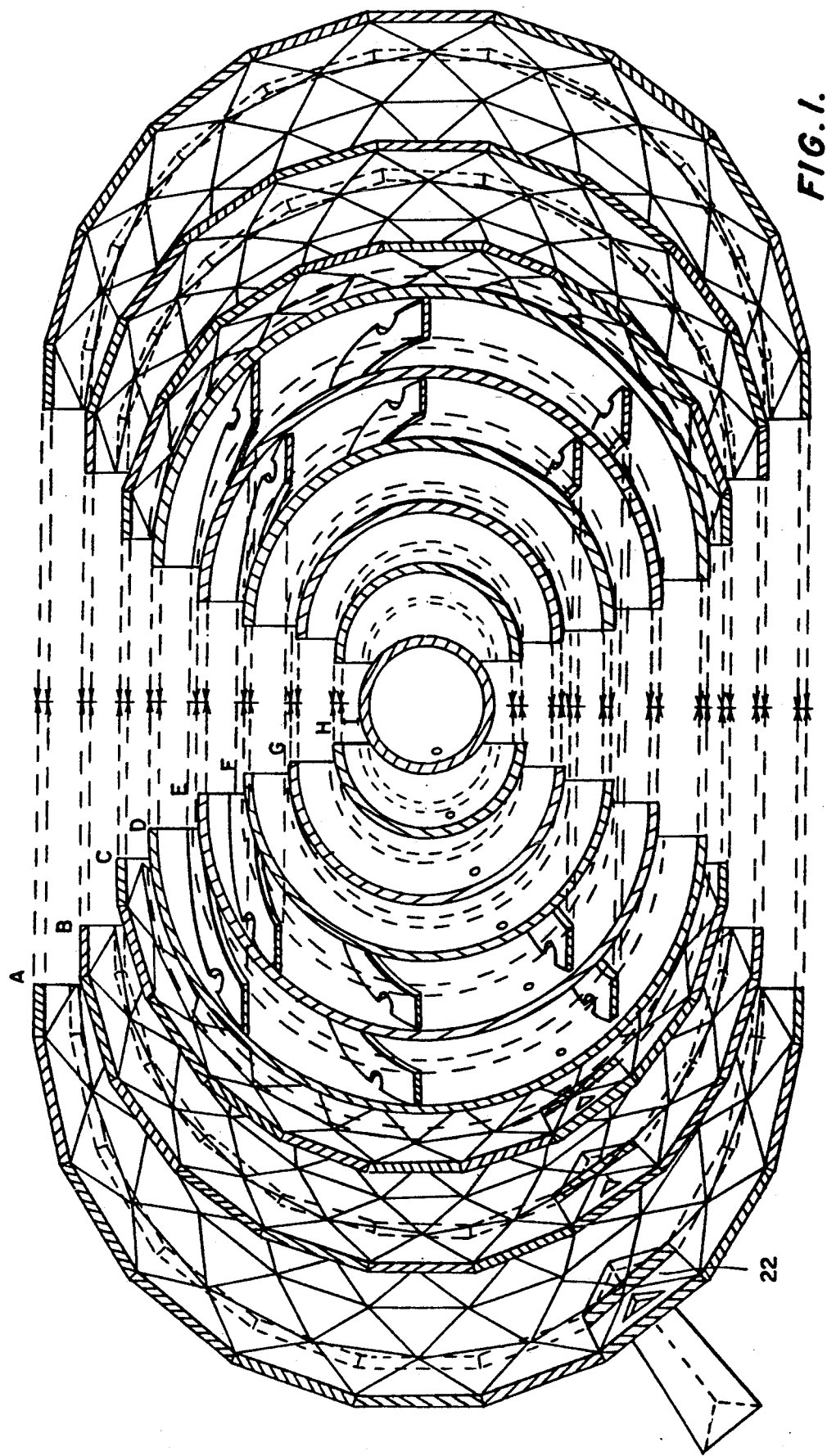
FIG. 1 shows portion of a space station embodying the invention, in an an exploded sectional view.
Figures 2, 2A:
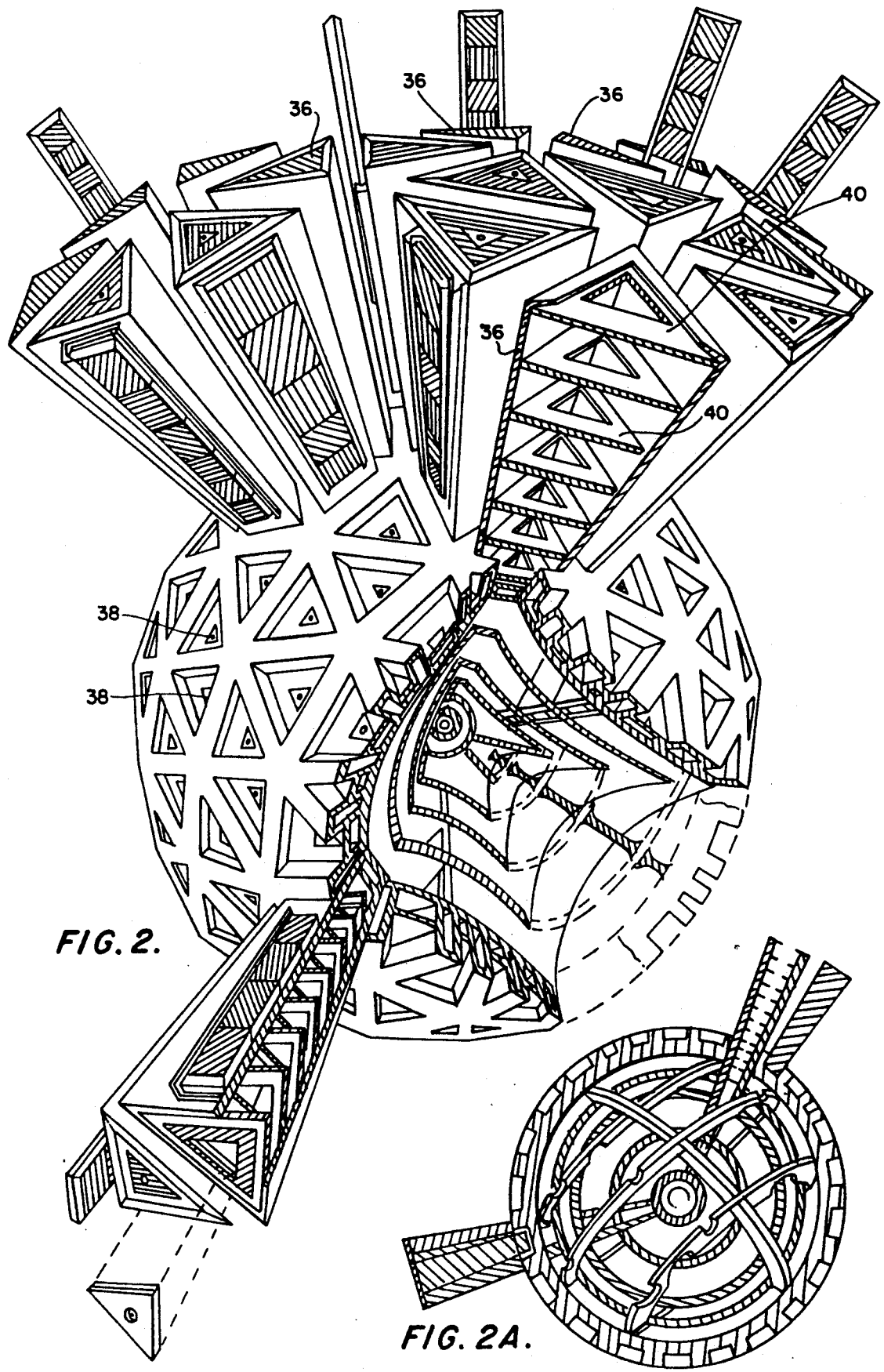
FIG. 2 is an elevational view, partially broken away, of the station shown in FIG. 1, with modular towers inserted.
FIG. 2A is a partial sectional view of modified form of the invention.

The invention is embodied in a modular space station illustrated in FIGS. 1-2. The station is regular in shape; that is, its surface is defined by a sphere, regular polygon, or cylinder. The volume of the station is divided radially by shells A-I lying at different radii from the center of the station, and the shells are similar, in the geometric sense, to the exterior of the station. The geometry of the station is established by creating a lattice framework defining the radially spaced shells, and further dividing each shell laterally into cells 22 of geometrically similar shape.

Since the basic idea underlying this invention is the modular growth patterning concept, it is particularly desirable that all cells be similar in shape, and that each shell have the shape of an icosahedron, whose twenty faces are identical equilateral triangles. Other regular geometries may be used as well.

The lattice structure is supplemented, as desired, by panels which may either be perpendicular to the radial direction (decks 24) or within a radial plane (walls 26). In the preferred icosahedral configuration, each deck panel 24 is triangular and each wall panel 26 is trapezoidal. All panels can be scribed, patterned and manufactured on site by the armature-mounted laser described below.

An advantage of the modular approach is that each cell constitutes an independent module for use by private organizations. The modules may have lateral openings in their walls, to provide communication with neighboring modules.

An advantage of the icosahedron is that it is regular, so that all modules at a particular radius can be identical, and thus interchangeable. However, any geometry can by used that is sufficiently regular to permit a large degree of interchangeability.

The exterior cells 22 of the structure (receptacle cells) have aligned apertures 34 in their decks 30 for receiving tapered modular towers 36, each the shape of a conical frustum, or alternatively, the frustum of a triangular pyramid.

Apertures can be provided in several radially aligned layers of cells, to admit towers more than one cell in length. The apertures are normally closed by hatches 38, but can be opened when necessary to admit a new tower, or for removal thereof. FIG. 2 shows a station comprising a plurality of closely adjacent towers of triangular cross-section. Each tower is divided lengthwise by triangular bulkheads 40 as shown in FIG. 2.

Inasmuch as the invention is subject to many modifications and changes in detail, it is intended that the foregoing description shall be regarded as merely illustrative of the invention, whose scope is to be measured by the following claims.

I claim:
1. A modular space station comprising
a frame having radial symmetry about its center,
said frame including a plurality of towers extending radially from said center, said towers defining a plurality of identical angularly spaced sites for receiving cargo modules of a predetermined standard external geometry, whereby said modules may be removably installed into said frame at any available site, and
means for defining sites at incremental radii from said center, said means comprising bulkheads supported by said towers at incremental radii from said center.

* * * * *